United States Patent [19]
Rudbarg

[11] 3,789,188
[45] Jan. 29, 1974

[54] INSULATED PIPE LINE FOR HEATED MATERIALS
[75] Inventor: Frank Rudbarg, Bala-Cynwyd, Pa.
[73] Assignee: FMC Corporation, Philadelphia, Pa.
[22] Filed: Feb. 14, 1972
[21] Appl. No.: 226,119

[52] U.S. Cl.................. 219/301, 137/341, 138/33, 138/148, 219/298, 219/535
[51] Int. Cl......................... H05b 3/00, F16l 53/00
[58] Field of Search... 138/148, 149, 111, 113, 114, 138/33; 137/341; 219/301, 296–299, 208, 535

[56] References Cited
UNITED STATES PATENTS
| | | | |
|---|---|---|---|
| 504,871 | 9/1893 | Forsyth | 138/148 X |
| 1,399,393 | 12/1921 | Millner | 219/301 |
| 2,288,248 | 6/1942 | Long | 219/301 X |
| 2,211,380 | 8/1940 | Mikkelson | 219/301 X |
| 2,793,277 | 5/1957 | Gehrke et al. | 219/301 UX |
| 978,808 | 12/1910 | Ayer | 219/301 |

FOREIGN PATENTS OR APPLICATIONS
564,986  11/1932  Germany..................... 219/301

Primary Examiner—A. Bartis
Attorney, Agent, or Firm—Thomas R. O'Malley et al.

[57] ABSTRACT

Apparatus for transporting a heated flowable material which includes at least one pair of telescoped conduits which are spaced from each other throughout the lengths thereof and which are formed of heat conductive material. The outermost of such telescoped conduits is electrically heated and is slidably supported within grooves formed in opposing surfaces of flanges fixed to the ends of the innermost of such telescoped conduits so that such outermost conduit may move freely in a longitudinal direction under varying thermal conditions. A spacer is disposed between the telescoped conduits only at spaced intervals thereof and and engages with the outermost of such conduits only when at least one of such telescoped conduits is subjected to deflections which would otherwise urge such telescoped conduits into direct contact with each other.

7 Claims, 4 Drawing Figures

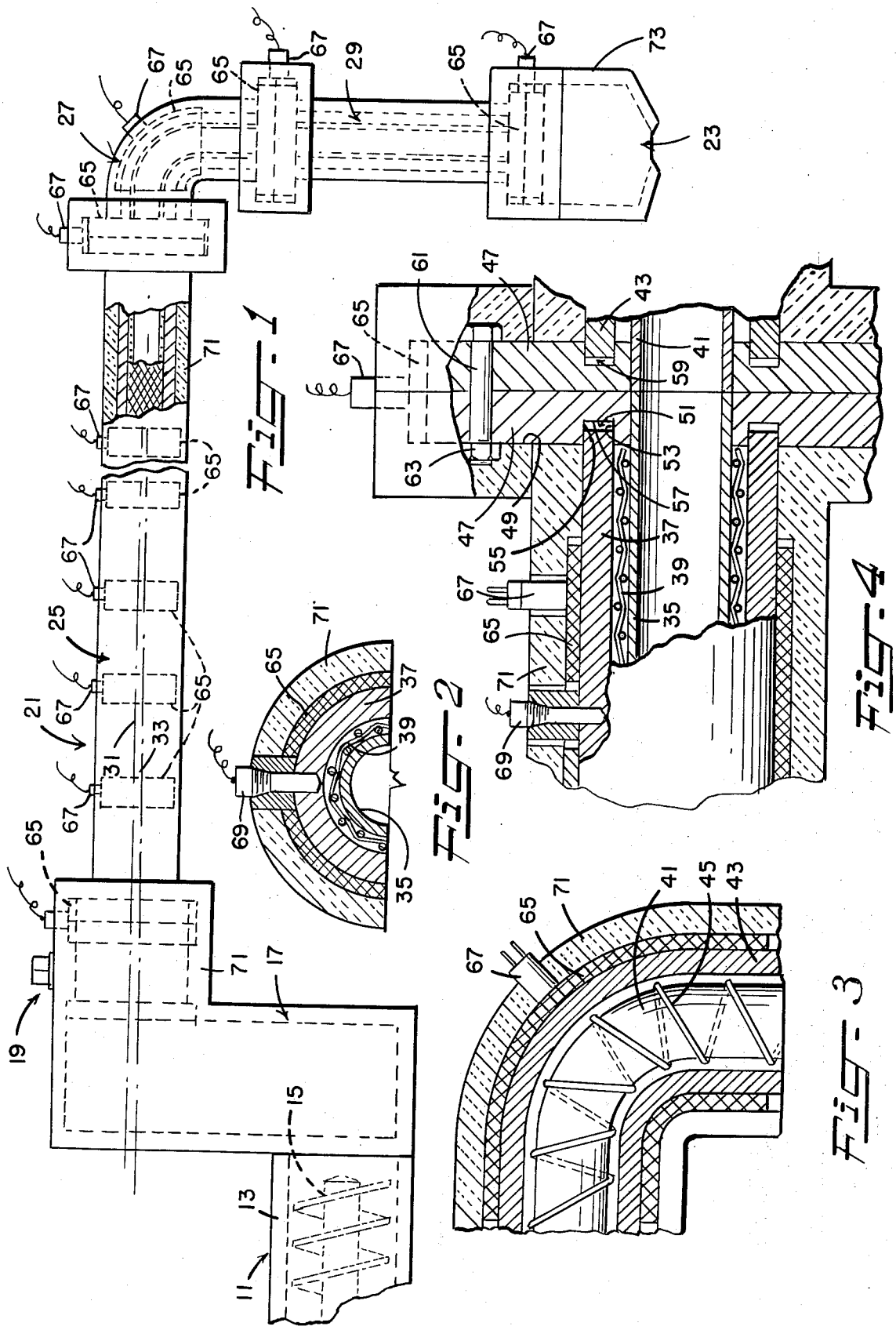

INSULATED PIPE LINE FOR HEATED MATERIALS

The present invention is directed to an apparatus, and particularly a pipe line, for transporting a heated flowable material.

The apparatus of the present invention is adapted for use with a variety of temperature-sensitive materials; that is, materials which must be maintained within a desired temperature range to facilitate their transfer and intended use yet avoid damage to or destruction of chemical and/or physical properties thereof. One application in which the apparatus of the present invention is eminently suited is in the transfer of thermoplastic polymeric film or fiber-forming materials, such as polyamides, polyesters, polyethylenes, etc. from an extruder, in which they are rendered molten, to a nozzle or die from which they are extruded as shaped products.

Molten thermoplastic polymeric material which is exposed to excessively high temperatures generally experiences degradation and gelling which alters its viscosity and, frequently, produces deposits within such material and/or on the heated equipment surfaces with which such material is in contact. Similarly, the application of insufficient or varying degrees of heat to a molten thermoplastic polymeric material during its transfer generally results in variations in its viscosity and often in gel formations.

Variations in the viscosity of the material which is being extruded and/or the presence of deposits within such material and/or on equipment surfaces is evident by non-uniform characteristics, i.e., drawability and dye-ability, in the products which are produced, as well as the inclusion of deposits within such products. Thus, aside from making an inferior product, interruptions during extrusion and/or subsequent product treating operations, such as film or fibers stretching, is often experienced.

The existence of gels and other deposits within the molten thermoplastic material necessitates frequent changes in filters, while a build-up of deposits on heated equipment surfaces may involve a complete cessation of extrusion operations for proper removal of such deposits. Accordingly, a primary object of this invention is to provide a generally new or improved and more satisfactory apparatus for transporting heated flowable materials.

Another object is the provision of an improved thermally insulated apparatus for tranporting flowable materials and maintaining such materials within a desired temperature range during the transport thereof.

Still another object is the provision of an improved pipe line which is capable of distributing heat generally uniformly from localized heat sources.

A further object is the provision of an improved double-walled pipe line for use in conveying flowable materials, which pipe line is adapted to compensate for length variations due to differing thermal conditions.

A still further object is the provision of an improved transfer line for heated flowable materials in which heat losses are minimized, which is simple to fabricate, and can be readily disassembled for repair and maintenance service.

These and other objects are accomplished in accordance with the present invention by an apparatus which includes at least one pair of conduits or tubes disposed in telescoped, spaced apart relationship, with both of such conduits being formed of heat-conductive materials. Flanges are fixed to the opposite ends of the innermost of such pair of telescoped conduits and include, on the opposing surfaces thereof, endless grooves within which are slidably received end portions of the outermost of such pair of telescoped conduits. Means are provided for heating the outermost conduit, which conduit is of a length greater than the distance between the opposing flange surfaces but less than the distance between the bottoms of the opposing flange grooves so to facilitate free longitudinal movement thereof under varying thermal conditions. A thermal insulating material surrounds the outermost conduit to minimize heat losses.

With the construction described above, a stagnant layer of air exists within the cavity between the telescoped conduits. A spacer means is disposed within this cavity and is engaged with the outermost surface of the innermost conduit at only spaced intervals thereof. This spacer means will engage with the inner-most surface of the outermost conduit at only spaced intervals thereof but only when at least one of the telescoped conduits is subjected to deflections which might otherwise urge the telescoped conduits into direct contact with each other. Deflection or bending of either or both of such telescoped conduits might well be encountered when, through inadvertence, excessive loads are applied to the outermost conduit, during transport of the telescoped conduits to and/or during the assembly thereof at the site of use; when unusually long conduit spans are employed; during equipment and/or building vibrations; conduit warpage, etc.

In the absence of the spacer means, deflection of at least one of the telescoped conduits as cause direct contact between such conduits would result in heat being transferred from the outermost to the innermost of the telescoped conduits by conducton at such contact loaction. Thus, areas of the innermost conduit would be heated to different degrees, being hottest at the location at which the telescoped conduits are in contact. Under such conditions viscosity variations in the material which is being conveyed, together with degradation and/or gelling of such material, may be experienced. This condition, however, is hidden and in a film or fiber extrusion operation, for example, may escape detection until well after other extensive time-consuming and costly measures have been taken in an effort to correct this problem, and after much inferior and perhaps useless product has been made.

In applications where a series of such pairs of telescoped conduits are employed, the pairs of conduits are disposed in end-to-end relationship with the flanges thereof abutting and connected to each other to together form a continuous fluid-tight passage. With telescoped conduits which are arranged with their axes substantially straight, the spacer means is preferably a woven metal screen which is wrapped about the outermost surface of each of the innermost conduit. On the other hand, if the axes of the telescoped conduits are curvilinear, the spacer means preferably consists of a wire which is wrapped helically about the outermost surface of the innermost of such telescoped conduits. In both instances, the spacer means serves well to prevent direct conduit contact and to minimize the amount of heat which is transmitted by conduction when at least one of the telescoped conduits is deflected.

Heat is applied to the outermost conduit of each pair of telescoped conduits, and desirably to the flanges also, preferably by electrically controlled band heaters which extend about such conduits at spaced intervals thereof. While the band heaters are spaced from each other, the heat provided by such sources does not remain localized but is rapidly transmitted by conduction to all portions of the outermost conduits. Preferably, such outermost conduit is formed of aluminum or other like material having high heat conductivity characteristics.

As heretofore mentioned, the outermost conduit of each pair of telescoped conduits is adequately supported by and is free to move longitudinally relative to such supporting flanges in response to temperature variations. In the event such outermost conduit is deflected into engagement with the spacer means, the spacer means would tend to limit such deflection and may well offer some support for such outermost conduits as to prevent binding thereof with its supporting flanges.

The woven metal screen and/or the wire spacer means which are used in the apparatus of the present invention are preferably formed of stainless steel. Desirably, an open mesh screen of fine wire is employed and, in view of its woven construction, will make essentially point contact with the surfaces of the telescoped conduits with which it is engaged. Similarly, the helically wound spacer is formed of fine wire so as to make only a line contact with the conduit surfaces with which it is engaged. The turns of such helically disposed wire are well spaced from each other to minimize contact areas.

With the spacer means construction described, heat transfer between the outermost and innermost of the telescoped conduits is achieved essentially by radiation. In the event deflections do cause contact between the spacer means and the outermost of the telescoped conduits, a minimum of heat will be transmitted by direct conduction at such location of contact. Thus, generally no significant temperature variations exist along areas of the innermost of the telescoped conduits, and no "hot spots" are created within the material which is being transported within such conduits. Desirably, sensors or probes extending through the wall of the outermost of the telescoped conduits and into the space between such conduits and/or into the wall of and/or within the innermost conduits are provided for measuring and recording temperatures and controlling the band heaters.

It is essential that heat losses from the apparatus be minimized for the sake of economy and to avoid non-uniform temperature conditions along the length of the pipe line. This objective is readily achieved by surrounding each pair of telescoped conduits and conduit flanges with suitable thermal insulating material, as for example, fiberglass, preferably shaped into preformed panels having reflective inner and outer sheets and connected to each other about the telescoped conduits by quick-release fasteners for easy assembly and removal.

As heretofore mentioned, the apparatus of the present invention is adapted for use with a variety of temperature sensitive flowable materials. Such apparatus is especially useful in the conveyance of molten thermoplastic polymeric materials, as from an extruder to a shaping die or spinneret and is hereafter described in detail in such application.

For a greater understanding of this invention, reference is made to the following description and drawing in which;

FIG. 1 is a side view of the apparatus of the present invention, with a portion thereof being broken away to illustrate interior details thereof;

FIG. 2 is a transverse section taken vertically through a portion of one pair of telescoped conduits of the present invention;

FIG. 3 is a vertical section taken longitudinally through another pair of telescoped conduits of the present invention; and FIG. 4 is a view similar to FIG. 1 illustrating portions of adjacent pairs of telescoped conduits of the present invention.

With reference to FIG. 1 of the drawing, character 11 indicates a portion of a conventional extruder which includes a barrel 13 and a screw 15. Heating means, not shown, serve to melt pellets of thermoplastic polymeric material within the barrel 13 concomitantly with the advancement of such material therethrough by the screw 15.

The molten polymeric material which is discharged from the extruder 11 passes into and through one of a pair of parallel filter units 17, through a diverter valve 19 and into the apparatus or pipe line of the present invention, which is indicated generally at 21. A nozzle or die 23 is attached to the exit end of the apparatus 21 for shaping the molten polymeric material into a film as it issues therefrom. Positioned between the extruder 11 and filter units 17, but not illustrated, is a diverter valve which cooperates with the valve 19 for directing flow through one of the filter units 17 while the other of such pair of filters is undergoing cleaning or other service. The extruder, filter units, diverter valves and film shaping nozzle which are disclosed may be of conventional construction and serve merely to illustrate the application of the apparatus of the present invention.

In the embodiment illustrated in the drawing, the pipe line 21 includes one or more straight, generally horizontal, sections 25 extending from the diverter valve 19 to an elbow section 27, and a straight vertical section 29 connecting the elbow section 27 to the nozzle 23. While the molten polymeric material flows under pressure through the pipe line 21, the axis 31 of the straight sections 25 of such pipe line may be inclined slightly relative to the horizontal plane, indicated at 33, to encourage drainage of molten polymeric material therefrom when extrusion operations are terminated.

The sections 25 and 29 are of like construction, with each including a pair of telescoped conduits 35 and 37 which are spaced from each other and, preferably in coaxial relationship. To facilitate a desired rapid heat transfer to the innermost conduit 35, yet provide for proper support of the telescoped conduits, the outermost conduit 37 is rather massive. For the specific application mentioned, the conduit 35 may be made of stainless steel while the conduit 37 is formed of aluminum of like material to provide for good heat-conductive characteristics. A woven screen 39 formed, for example, of stainless steel is wrapped about the outermost surface of the conduit 35 and, in the absence of deflection of either of the conduits 35 and 37 from their intended coaxial relationship, is spaced from the innermost surface of the conduit 37.

The elbow section 27 also includes a pair of coaxial conduits 41 and 43, which correspond to the conduits 35 and 37. A wire 45, formed of stainless steel, for example, is wound helically about and tack welded at spaced intervals to the outermost surface of the conduit 41 and, in the absence of deflection of either of the conduits 41 and 43, is spaced from the innermost surface of the conduit 43.

As shown in FIG. 4, individual flanges 47 are fixed, as by welding, to each of the opposite ends of the conduits 35 and 41. The opposing surfaces 49 of the flanges 47 fixed to the ends of the conduit 35 are each formed with an endless groove 51, with the grooves 51 in such opposing flange surfaces 49 being aligned with each other and shaped to receive the end portions of the conduit 37. A comparatively loose fit is provided between the conduit 37 and the side walls 53 and 55 of the flange grooves 51, and the distance between the bottom walls 57 of such opposing grooves 51 is greater than the length of the conduit 37 to facilitate free expansion of such conduit at elevated temperatures. The flanges 47 carried by the conduit 41 are likewise each formed with an endless groove 59, with the opposing flange grooves 59 being aligned with each other and loosely receiving the ends of the conduit 43.

Pipe line sections 25, 27 and 29 are connected in end-to-end relationship by bolts 61 extending through adjacent abutting flanges and fixed in place by nuts 63.

At spaced intervals along the lengths of the conduits 35 and 43 as well as about the diverter valve 19 and nozzle 23 are located band heaters 65 which are energized from a suitable electric source through connectors 67. Sensors 69 are employed for measuring temperatures at different locations, for example for controlling the operation of the heaters 65.

The entire outer surface of the diverter valve 19 and pipe line sections 25, 27, and 29, together with the flanges thereon are covered with a fiberglass insulation 71 which is preferably in the form of preshaped sectional panels having inner and outer heat-reflective sheets of aluminum. These insulating panels are desirably connected about the various members with quick-release fasteners. In the particular embodiment illustrated, the nozzle 23 is also shielded with heat insulating panels 73 also formed of fiberglass.

In the above described construction, a stagnant layer of air exists between telescoped conduits. The spacing between the woven screen 39 and the innermost surface of the conduit 37 of the sections 25 and 29, and the corresponding spacing between the helically wound wire 45 and the innermost surface of the conduit 43 of the section 27 may be varied to accommodate the tolerable conduit deflections. The screen 39 and the wire 45 are such as to provide for only point and line contact when such members engage with the innermost surface of the respective members 37 and 43.

In pipe line sections 25 and 29, in which opposing surfaces of telescoped conduits were spaced about 0.50 inches from each other, satisfactory results have been achieved using screens 39 having stainless steel wires slightly less than 0.05 inches in diameter woven at center-to-center spacings of from one-fourth to one-half inches. With pipe line sections 27 in which the opposing conduit surfaces were spaced about 0.50 inches, a 16 gauge wire wrapped helically about the outermost surface of the conduit 41 at one-half to 1 ½ inch spacing proved to function properly.

The tolerances between the walls defining the flange grooves 51 and 59 and the outermost conduit 37 and 41 of the respective sections 25 and 27 must be such as to accommodate for the expansion of the flanges and conduits, yet permit free movement of such conduits relative to the respective flanges. In a pipe line having aluminum conduits 37 and 41 and flanges 47 formed of stainless steel, the above desired objectives has been achieved by providing a clearance of from 0.003 to 0.006 inches between the inside surfaces of such conduits and the adjacent walls of the flange grooves and a clearance of from 0.015 to 0.020 inches between the outside surfaces of such conduits and the outer walls of the flange grooves.

It is to be understood that changes and variations may be made without departing from the spirit and scope of the invention as defined in the appended claims.

I claim:

1. Apparatus for use in transporting of heated flowable material including at least one pair of conduits disposed in telescoped, spaced-apart relationship throughout the lengths thereof, the conduits of each such pair of conduits formed of heat-conductive materials, flanges at the opposite ends of the innermost conduit of said pair of telescoped conduits, an endless groove in each of the opposing surfaces of said flanges within which grooves are slidably received end portions of the outermost conduit of said pair of telescoped conduits, means for heating said outermost conduit, said outermost conduit having a length which is greater than the distance between said opposing flange surfaces but less than the distance between the bottoms of the opposing flange grooves to facilitate free movement of said outermost conduit in a longitudinal direction under varying thermal conditions, spacer means disposed between the opposing surfaces of said telescoped conduits and engaged with the outermost surface of said innermost conduit at only spaced intervals thereof, said spacer means being normally spaced from said outermost conduit and engaging with the innermost surface of said outermost conduit at only spaced intervals thereof and only when at least one of the telescoped conduits is subjected to deflections which would otherwise urge the telescoped conduits into direct contact with each other, and thermal insulating material engaged with and surrounding said outermost conduit.

2. Apparatus as defined in claim 1 wherein the axes of at least one of such pairs of telescoped conduits are generally straight and wherein the spacer means between such conduits is a woven metal screen.

3. Apparatus as defined in claim 2 wherein a series of said pairs of telescoped conduits are disposed in end-to-end relationship with the flanges of adjacent of such pairs of telescoped conduits being in abutting relationship, and means connecting said abutting flanges to each other.

4. Apparatus as defined in claim 3 wherein the axes of one pair of the series of pairs of telescoped conduits is curvilinear and the spacer means between the conduits of such pair of conduit is a wire wound helically about the outermost surface of said innermost conduit.

5. Apparatus as defined in claim 4 wherein said heating means includes electrically operated band heaters extending about the outermost surface of each of the outermost conduits of each of said pairs of telescoped conduits at only longitudinally spaced intervals thereof, and further including heaters extending about the connected flanges, and means formed of thermal insulating material surrounding the interconnected flanges.

6. Apparatus as defined in claim 3 wherein the outermost conduit of each of said pairs of telescoped conduits is formed of aluminum.

7. Apparatus as defined in claim 1 wherein the axes of at least one of such pairs of telescoped conduits are curvilinear and wherein the spacer between such conduits is a wire wound helically about the outermost surface of said innermost conduit.

* * * * *